(12) United States Patent
Niss et al.

(10) Patent No.: US 11,456,020 B2
(45) Date of Patent: Sep. 27, 2022

(54) MULTIBODY CHAMBERED ACOUSTIC ATTENUATOR FOR A DATA STORAGE SYSTEM

(71) Applicant: Western Digital Technologies, Inc., San Jose, CA (US)

(72) Inventors: David Niss, Boulder, CO (US); Hussam Zebian, San Jose, CA (US); Dana Fisher, Berthoud, CO (US); Jeffrey Wilke, Palmer Lake, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 4 days.

(21) Appl. No.: 16/917,534

(22) Filed: Jun. 30, 2020

(65) Prior Publication Data

US 2021/0407549 A1    Dec. 30, 2021

(51) Int. Cl.
*G11B 33/08* (2006.01)
*G06F 1/18* (2006.01)
*G06F 1/20* (2006.01)
*G11B 33/12* (2006.01)

(52) U.S. Cl.
CPC ............ *G11B 33/08* (2013.01); *G06F 1/187* (2013.01); *G06F 1/20* (2013.01); *G11B 33/125* (2013.01)

(58) Field of Classification Search
CPC ......... G11B 33/08; G11B 33/142; G06F 1/20; G06F 3/0674; H05K 7/20172; H05K 7/20145; H05K 7/20136
USPC ................. 361/695, 962, 679.34; 454/906; 181/224, 284; 381/71.1
See application file for complete search history.

(56) References Cited

U.S. PATENT DOCUMENTS

| | | |
|---|---|---|
| 6,086,476 A | 7/2000 | Paquin et al. |
| 6,445,587 B1 | 9/2002 | Pavol |
| 7,549,505 B1 | 6/2009 | Kawar |
| 8,701,821 B2 | 4/2014 | O'Coimin et al. |
| 8,714,302 B2 | 5/2014 | Gradinger et al. |

(Continued)

OTHER PUBLICATIONS

Bolton, Connor et al., Blue Note: How Intentional Acoustic Interference Damages Availability and Integrity in Hard Disk Drives and Operating Systems, IEEE Symposium on Security and Privacy 2018—v2, 15 pp., spqr.eecs.umich.edu, downloaded from https://spqr.eecs.umich.edu/papers/bolton-blue-note-IEEESSP-2018.pdf.

(Continued)

*Primary Examiner* — Mandeep S Buttar
(74) *Attorney, Agent, or Firm* — John D. Henkhaus

(57) ABSTRACT

A data storage system includes a chassis housing multiple data storage devices, such as hard disk drives, a compartment housing cooling fans, and an air plenum positioned between the fans and the storage devices. A multibody chambered acoustic attenuator, which may be installed in the air plenum, includes a plate part having airflow holes therethrough and may include a convex arched part having airflow holes therethrough and coupled with the plate part to form a chamber. Acoustic damping material lines an interior surface of the plate part and the interior and exterior surfaces of the arched part, and the airflow holes of the plate part and of the arched part are not aligned, such that direct acoustic emissions and reflections would contact the acoustic damping material and a circuitous airflow path is provided from the cooling fans to the storage devices, to reduce the acoustic sound pressure upon the devices.

20 Claims, 6 Drawing Sheets

(56) References Cited

U.S. PATENT DOCUMENTS

| | | |
|---|---|---|
| 10,388,327 B2 | 8/2019 | Eguchi et al. |
| 2002/0051338 A1 | 5/2002 | Jiang et al. |
| 2011/0096494 A1 | 4/2011 | Cochrane |
| 2011/0149508 A1 | 6/2011 | Malekmadani |
| 2017/0221526 A1* | 8/2017 | Albrecht .............. G11B 33/144 |
| 2018/0330712 A1* | 11/2018 | Chen .................. H05K 7/20918 |
| 2019/0093674 A1 | 3/2019 | Kho et al. |
| 2019/0295601 A1* | 9/2019 | Paterra ................ G11B 33/022 |

OTHER PUBLICATIONS

Israel Patent Office (ISA/IL), PCT International Search Report and Written Opinion for counterpart International application No. PCT/US2021/017140, dated May 27, 2021, 8 pages.

* cited by examiner

MULTIBODY CHAMBERED ACOUSTIC ATTENUATOR FOR A DATA STORAGE SYSTEM

FIELD OF EMBODIMENTS

Embodiments of the invention may relate generally to data storage systems, and particularly to reducing vibration of storage devices constituent to data storage systems.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head makes use of magnetic fields to write data to, and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

There is a commercial demand for high-capacity digital data storage systems, in which multiple data storage devices (DSDs) are housed in a common enclosure. A DSD, such as an HDD, may undergo structure mode excitation in response to any number of environmental sources, especially in a multi-HDD storage system. Such mode excitation may be the result of, for non-limiting examples, adjacent device seek dependent mechanical coupling, system fan generated acoustic energy emissions, external vibration from the surrounding environment, other external disturbances transmitted through a common system motherboard and/or electrical connectors, and the like. In order to compensate for read-write head off-track issues due to HDD structure mode excitation that is transmitted to the read-write head, such as from the HDD cover and/or enclosure base, feed-forward systems are implemented into some HDDs. However, as HDD data tracks become narrower and narrower and system environments in which HDDs are installed generate more and more vibrational energy within the system (e.g., because of increased HDD density within the system, and system motherboard temperature demands, which require higher RPM fan usage), the frequency range of the vibration (and thus the energy) experienced by the HDDs is rising (e.g., above 2 kHz) and classical approaches to compensating for the effects of vibration may no longer be effective enough.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Generally, approaches to managing structure mode excitation affecting data storage devices within a data storage system are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instance of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Figure 2:
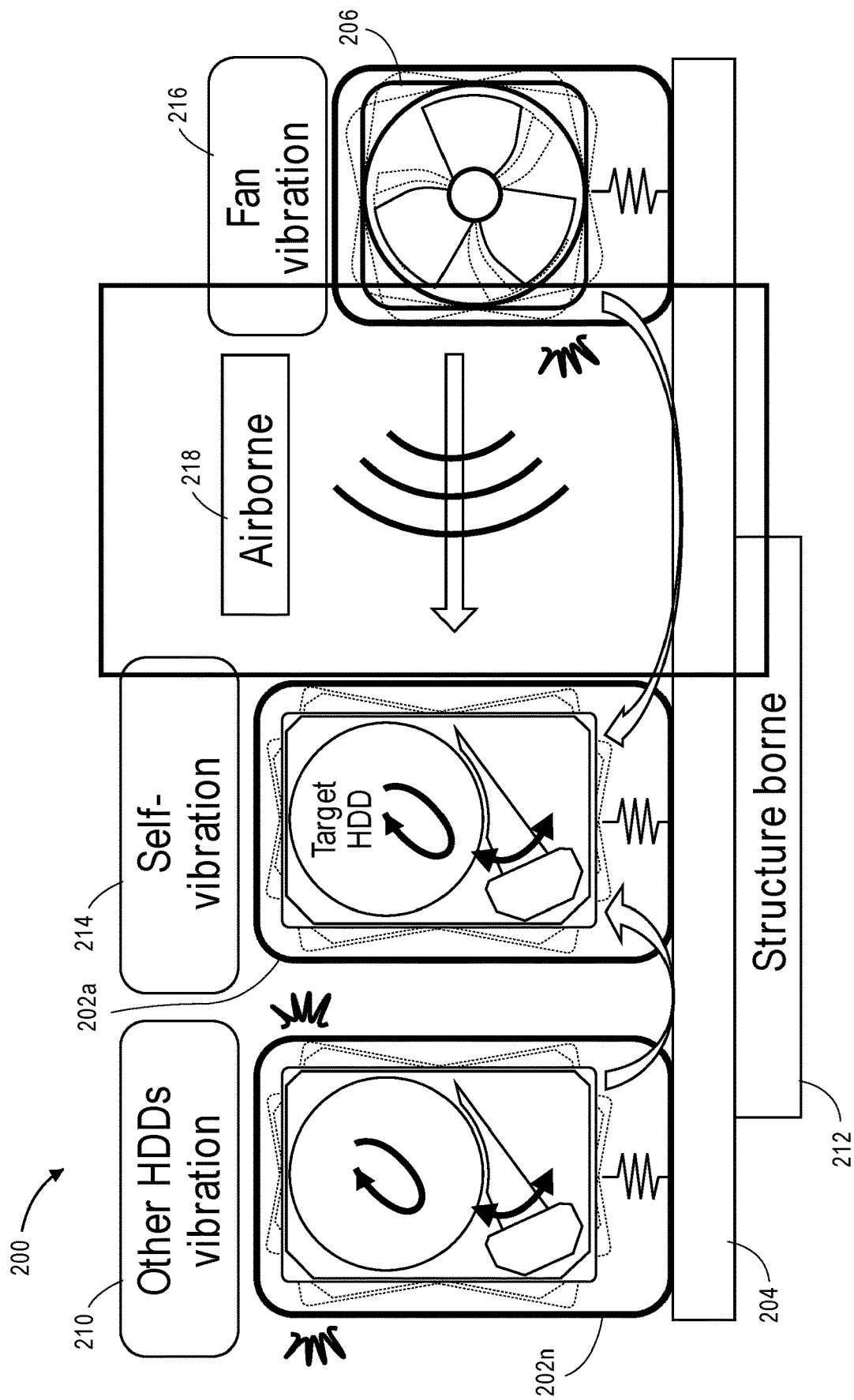
FIG. 2 is a side view schematic diagram illustrating sources and transmission of vibration within a data storage system.

FIG. 2 is a side view schematic diagram illustrating sources and transmission of vibration within a data storage system. Recall that in a high-capacity digital data storage system such as system 200, in which multiple data storage devices (DSDs) 202a-202n are housed in a common enclosure and may share a common chassis 204 (where n represents a number that may vary from implementation to implementation), a DSD 202a-202n such as an HDD may undergo modes of vibration in response to any number of environmental vibration sources. Such HDD vibration that is transmitted to the read-write head of a given HDD has a deleterious effect on the performance of the HDD, such as excessive non-repeatable runout (NRRO) for example, as well as on the performance of the larger storage system 200.

As illustrated in FIG. 2, there are multiple sources of vibration of a data storage device, such as DSD 202a, within a data storage system such as data storage system 200. Such vibration may be the result of, for example, mechanical coupling 210 among neighbor HDDs, structure borne disturbances 212 transmitted for example through a common system motherboard and/or electrical connectors and/or chassis 204 and/or from vibration 216 of a system fan(s) 206, self-vibration 214 from the rotating parts within the HDD, and airborne disturbances 218 such as airflow and acoustic energy (e.g., acoustic sound pressure) from the system fan(s) 206.

Studies have shown that sound (airborne) disturbance 218 is a dominating disturbance source in some data storage systems. Such sound disturbances are generated primarily from the system fan(s) 206 and, if left unchecked, typically lead to excitation of structure vibration modes of the DSD 202a. This, in turn, can have a non-trivial negative effect on device performance, as track following is very sensitive to vibration. For example, track following (such as measured by a position error signal, or "PES") has a direct effect on the read/write speed (I/O per second, or "TOPS"). Hence, reducing vibration of a DSD 202a such as an HDD can improve the PES and TOPS associated with the DSD 202a. Possible approaches to improving PES by suppressing modes of vibration may include implementing a stealth cooling fan, and/or shifting the frequency generated by the cooling fan, and/or implementing sound absorber material in the path between the cooling fan and the DSD.

Storage enclosures that include hard disk drive (HDD) and solid-state drive (SSD) data storage devices require cooling fans to keep device temperatures below published values to meet reliability and performance levels. For enclosures with installed HDD devices, the interaction between the cooling fan acoustic emissions and the HDD can lead to performance and reliability issues, especially in view of increasing capacity demands.

Figure 3:
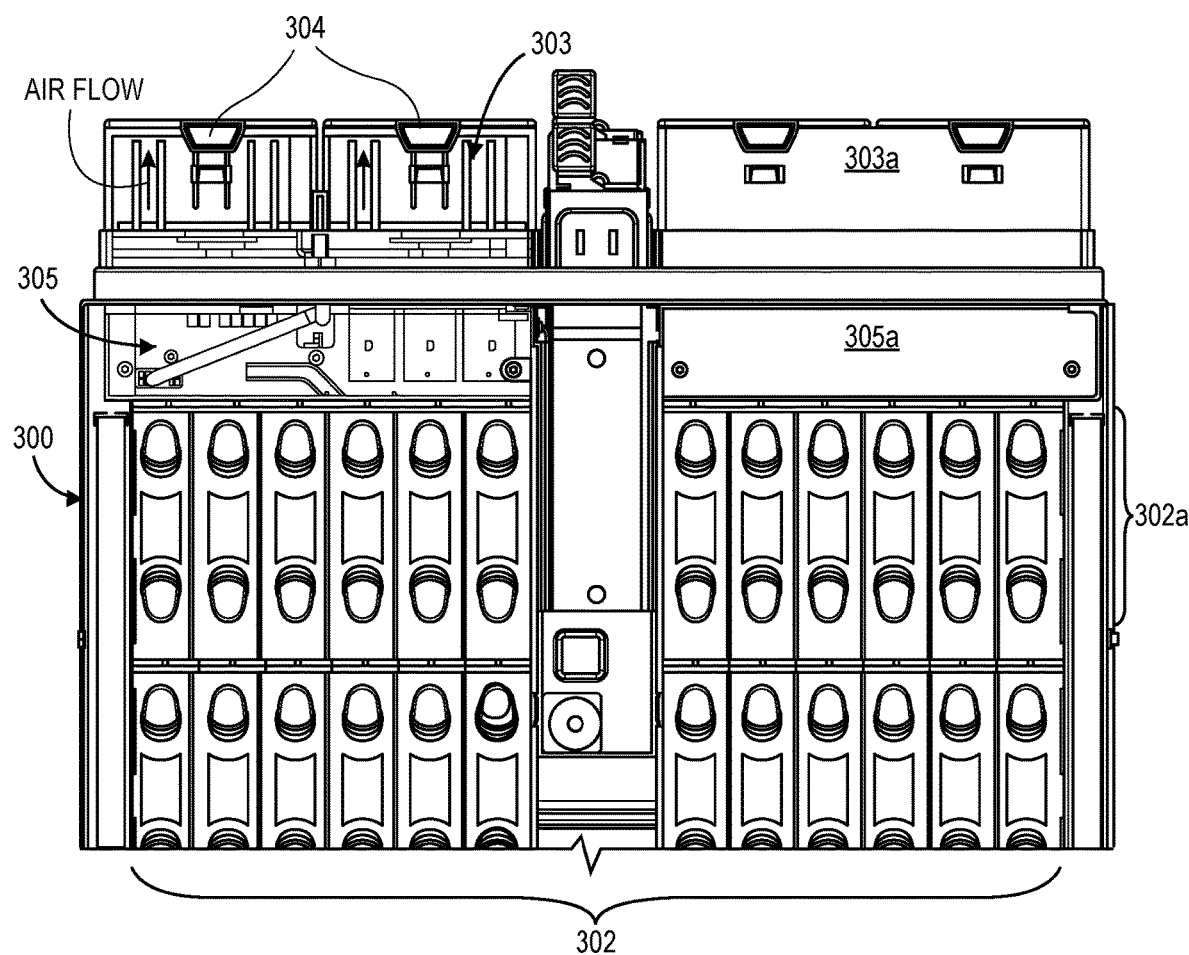
FIG. 3 is a plan view illustrating a data storage system rear chassis layout, according to an embodiment.

FIG. 3 is a plan view illustrating a data storage system rear chassis layout, according to an embodiment. FIG. 3 depicts a chassis 300 housing a plurality of data storage devices 302 (or simply "drives"), with the left-side cooling fan housing compartment 303 cover (e.g., 303a) and air plenum 305 cover (e.g., 305a) hidden. The acoustic noise is typically at a maximum at the row of drives 302a closest to at least one cooling fan 304, which can pose a significant challenge to all enclosures incorporating HDDs near cooling fans. One approach may be to increase the distance from the fans 304 to the first row of drives 302a. However, with increasing drive servo density in radial tracks per inch (TPI), the distancing approach is projected to no longer be sufficient to reduce NRRO below the target performance thresholds moving forward. The offset from the fans 304 to the last row of drives also needs to be reduced to allow enclosure use in more installations that have shorter front-to-back rack spacing. Another approach may be to simply insert multiple folded layers of acoustic attenuating foam between the fans 304 and the drives 302, however, this is not preferable due to the "filter" nature of the relatively thick foam material which would likely pose a long term reliability issue due to a buildup of entrapped contaminants. Thus, a challenge remains with minimizing the overall length of enclosures without sacrificing performance and reliability (e.g., excessive NRRO, overheating, and the like).

Figure 4A:
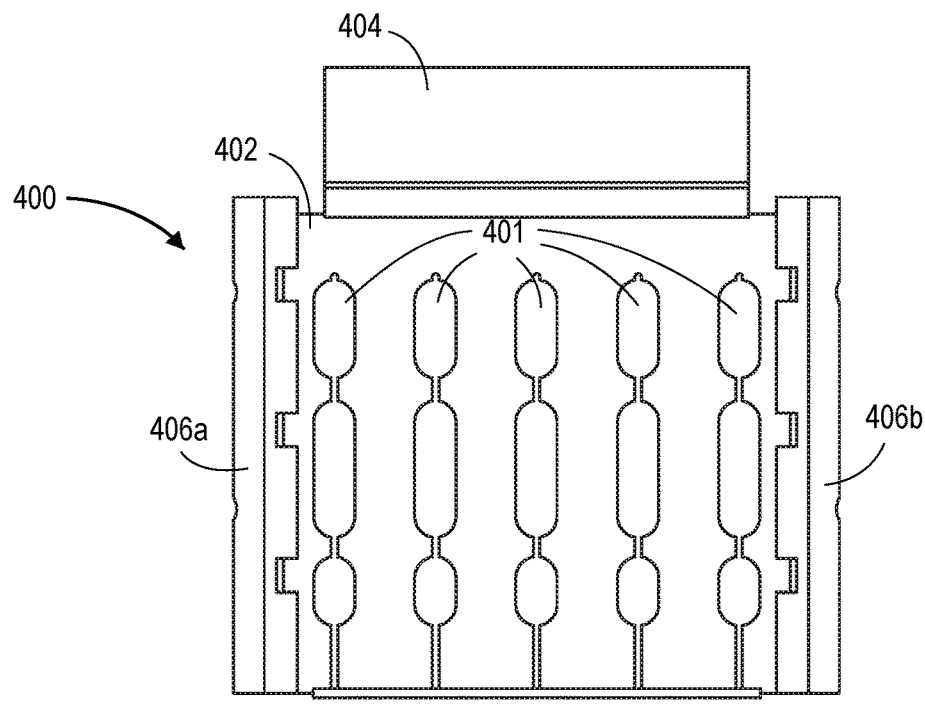
FIG. 4A is a front view illustrating an acoustic attenuator plate component, according to an embodiment.

Multibody Chambered Acoustic Attenuator for Reducing Drive Vibration in a Data Storage System Plate Part FIG. 4A is a front view illustrating an acoustic attenuator plate component, according to an embodiment. Plate component 400 (or "plate part") is depicted comprising a plurality of airflow holes 401 (or "airflow orifices") through a substantially planar main portion or main body 402. Plate component 400 further comprises a hinged (rotatable) top portion or top flap 404, and a side portion or side extension 406a, 406b on each side of the main body 402. According to an embodiment, at least one of the side extensions 406a, 406b extends at an angle (e.g., offset a few millimeters) from the main body 402, i.e., the side extension is not coplanar with the main body 402. According to an embodiment, the plate component 400 is composed of a plastic material.

Figure 4B:
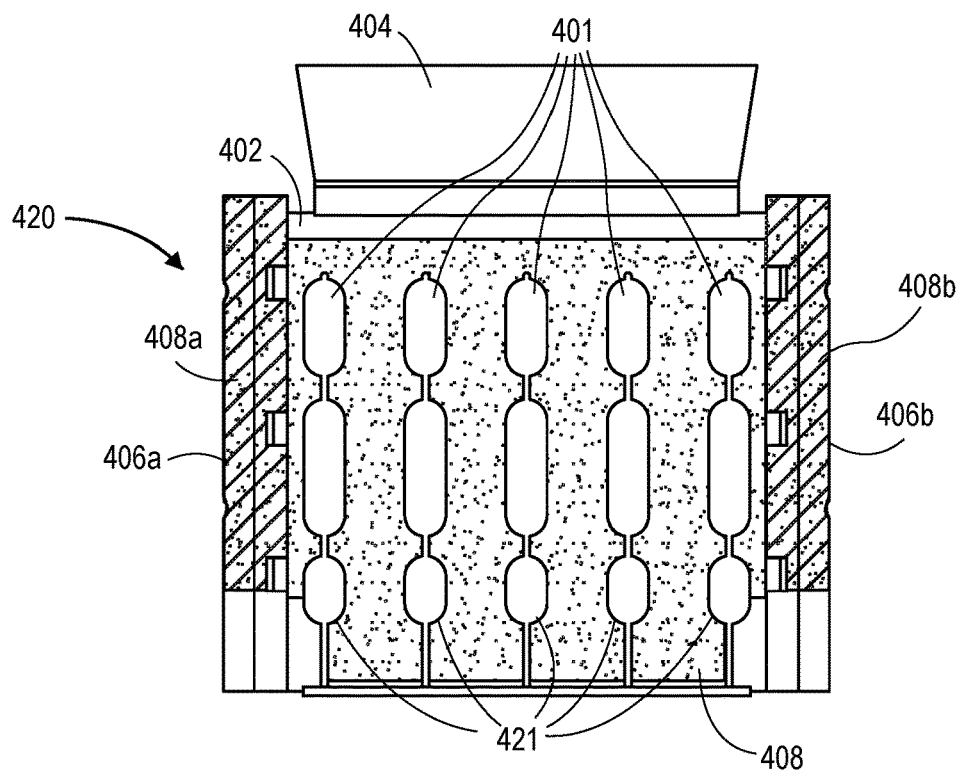
FIG. 4B is a front view illustrating the acoustic attenuator plate component of FIG. 4A covered in damping material, according to an embodiment.

FIG. 4B is a front view illustrating the acoustic attenuator plate component of FIG. 4A covered in damping material, according to an embodiment. Plate component 420 (or "plate part") is depicted comprising the plurality of airflow holes 401 through the substantially planar main body 402, and further comprising the hinged top flap 404, and the side extensions 406a, 406b on each side of the main body 402. Plate component 420 further comprises an acoustic damping sheet or acoustic damping material 408 coupled to an interior surface (e.g., using pre-applied adhesive film, for a non-limiting example), according to an embodiment. According to an embodiment, the acoustic damping material 408 is constructed using an acoustic damping sheet composed of a single sheet/single layer of acoustic damping material. According to an embodiment, the acoustic damping material 408 is composed of an acoustic damping sheet(s) having a substantially uniform thickness throughout, i.e., the acoustic damping material is not contoured or augmented with sound absorbing shapes (such as the classic "egg crate" shape, for a non-limiting example) such as with convoluted acoustic foam panels. Preferably, and according to an embodiment, a damping material is utilized that damps acoustic sound waves by material compression (e.g., strain/deflection damping) and not by the process of air moving through the acoustic medium, which offers a damping technique that would not build up as much entrapped contaminants as with "filter" like materials.

Similarly to the main body 402, the acoustic damping material 408 (or "acoustic damping sheet") comprises the same or similar airflow holes 421 (or "airflow orifices") through the layer of acoustic damping material 408 as the airflow holes 401 through the main body 402. Note that the illustrated configuration (e.g., shape, size, placement, etc.) of the airflow holes 401 through the main body 402 and the airflow holes 421 through the acoustic damping material 408 is an example, and in practice may vary from implementation to implementation based on, for example, the structural configuration of a corresponding chassis (e.g., chassis 300 of FIG. 3) in which the plate component 400, 420 may be installed (including, for example, the positioning of corresponding cooling fans such as fans 304 of FIG. 3, and the positioning of data storage devices such as data storage devices 302 of FIG. 3), the positioning of the plate component 400, 420 within the corresponding chassis, the airflow patterns internal to the chassis, and like considerations. However, according to an embodiment, the airflow holes 401 through the main body 402 and the airflow holes 421 through the acoustic damping material 408 are positioned in alignment with each other, so that the acoustic damping material 408 does not cover the airflow holes 401 so that airflow holes 401 and 421 collectively provide for the passage of airflow from the fans 304 through the plate component 420 to the storage devices 302, when installed in a chassis such as chassis 300.

According to an embodiment, the acoustic damping material 408 coupled to the plate component 400 includes acoustic damping material on at least one of the side extensions 406a, 406b, such as depicted by acoustic damping material 408a, 408b on both side extensions 406a, 406b (depicted in cross-hatch). This allows the acoustic damping material to be wrapped around the sides of the plate component 400 to seal the air passages between the sheet metal chassis (e.g., chassis 300 of FIGS. 3, 7) and the plate component 420. According to a related embodiment, the acoustic damping material 408 coupled to the plate component 400 including acoustic damping material 408a, 408b on at least one of the side extensions 406a, 406b, further wraps at least in part around the respective side extensions 406a, 406b. This functions to seal the air passages between the sheet metal chassis and the plate component since the material does not allow air to readily flow through, thus effectively blocking air from the outer air passages. According to an alternative embodiment, both side extensions 406a, 406b are devoid of the acoustic damping material 408a, 408b, i.e., the side extensions 406a, 406b are not covered by the acoustic damping material 408a, 408b.

Convex Arched Part

Figure 5A:
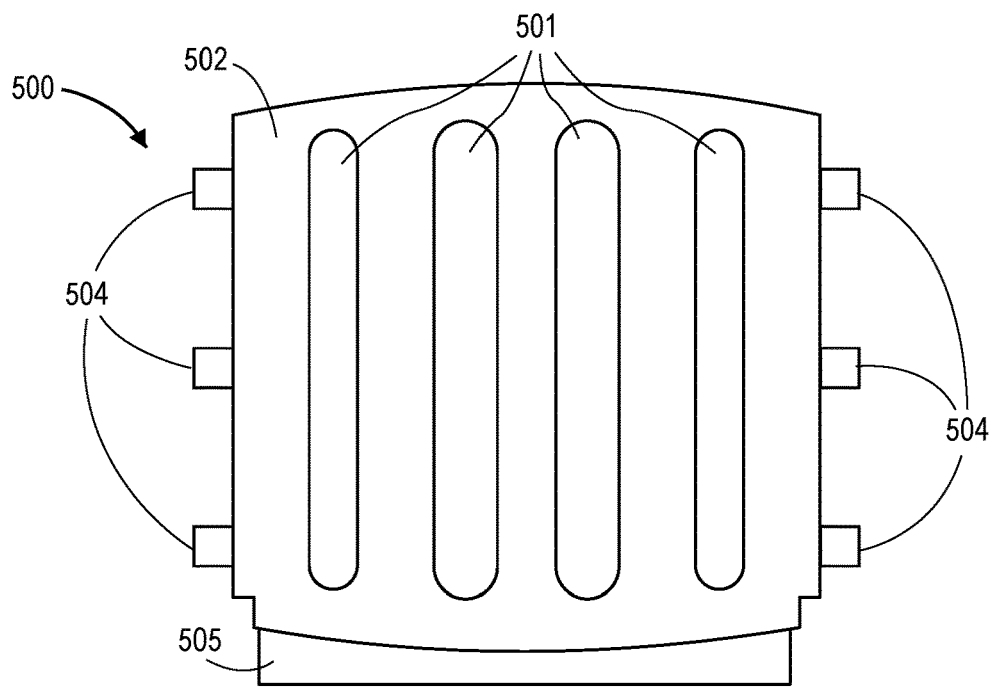
FIG. 5A is a front view illustrating an acoustic attenuator arched component, according to an embodiment.
Figure 5B:
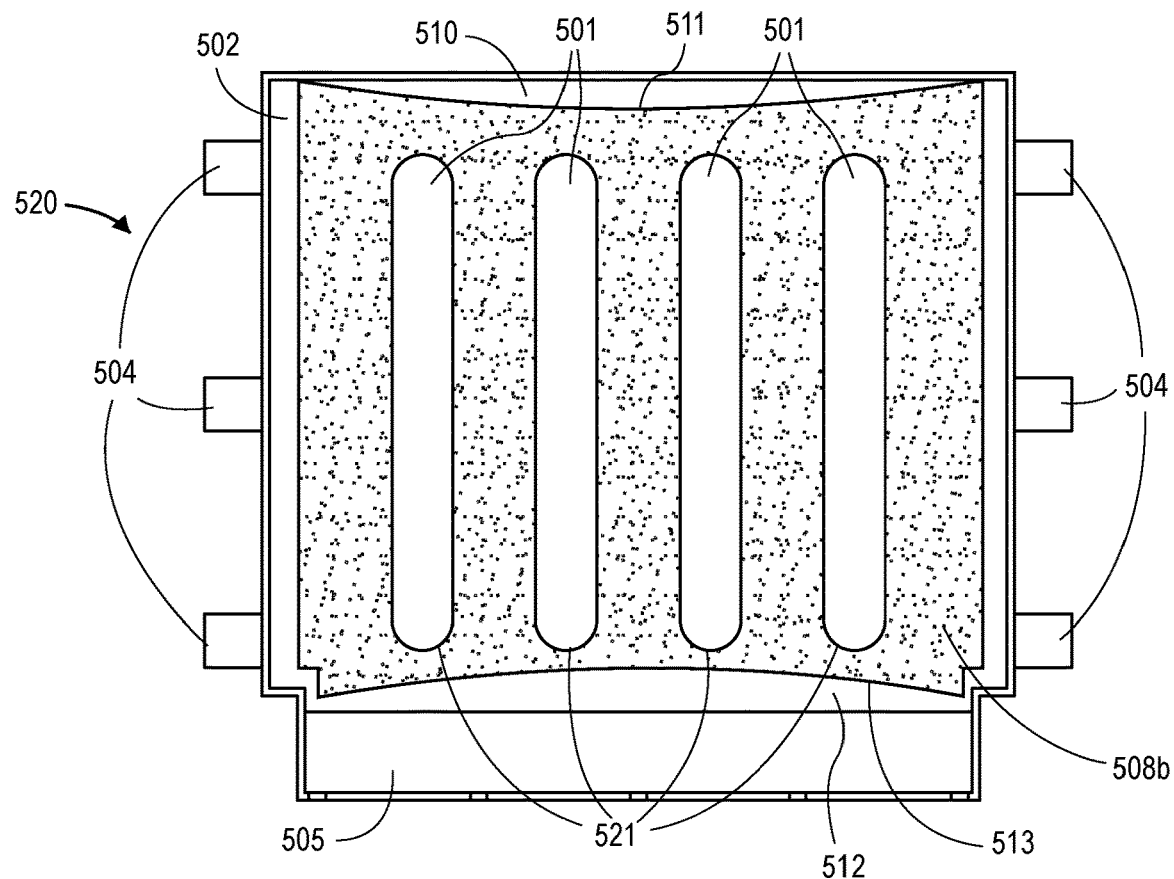
FIG. 5B is a back view illustrating the acoustic attenuator arched component of FIG. 5A covered in damping material, according to an embodiment.

FIG. 5A is a front view illustrating an acoustic attenuator arched component, according to an embodiment. A convex arched component 500 (or "arched part") is depicted comprising a plurality of airflow holes 501 (or "airflow orifices") through arched main portion or arched main body 502. Arched component 500 further comprises a plurality of assembly tabs 504 and a bottom extension 505, according to an embodiment. FIG. 5B is a back view illustrating the acoustic attenuator arched component of FIG. 5A covered in damping material, according to an embodiment. Convex arched component 520 (or "arched part") is depicted comprising the plurality of airflow holes 501 through the arched main body 502 and the assembly tabs 504 and the bottom extension 505. Structurally, arched component 520 further comprises a top closeout portion 510 extending from a top edge 511 of the arched main portion or arched main body 502, and a bottom closeout portion 512 extending from a bottom edge 513 of the arched main body 502. According to an embodiment, the arched component 500 is composed of a plastic material.

Arched component 520 further comprises an acoustic damping sheet or acoustic damping material 508a coupled to an interior surface, according to an embodiment. According to an embodiment, arched component 520 further comprises an acoustic damping sheet or acoustic damping material 508b coupled to an exterior surface (see, e.g., FIG. 6). Furthermore, according to a preferred embodiment, arched component 520 comprises an acoustic damping sheet or acoustic damping material 508a, 508b (collectively, acoustic damping material 508) coupled to both interior and exterior surfaces. According to an embodiment, the acoustic damping material 508 is composed of an acoustic damping sheet composed of a single sheet/single layer of acoustic damping material.

According to an embodiment, the acoustic damping material 508 is composed of an acoustic damping sheet(s) having a substantially uniform thickness throughout, i.e., the acoustic damping material is not contoured or augmented with sound absorbing shapes (such as the classic "egg crate" shape, for a non-limiting example) such as with convoluted acoustic foam panels. Here too a damping material is preferably utilized that damps acoustic sound waves by material compression (e.g., strain/deflection damping) and not by the process of air moving through the acoustic medium. One advantage of employing an acoustic damping material (e.g., acoustic damping material 408, 508, etc.) that removes energy by compression is that multiple layers, with the possibility of different thicknesses, may be used to adjust attenuation according to needs. Such layers may be stacked and intercoupled by way of an adhesive backing, which is not as feasible with typical flow-through type acoustic damping foams because of the potential impact of reducing the airflow through such a stack of layers based at least in part on the relatively less porous adhesive backings.

According to an alternative embodiment, flow-through type acoustic damping foam may be utilized in lieu of the compression type acoustic damping material, such as for purposes of reducing cost. For example, use of flow-through foam as a direct substitution for the compression material (i.e., while not blocking the airflow holes) would not reduce airflow through the acoustic attenuator in the long term but is considered less effective acoustically, and the risk of contaminant/particle entrapment (as discussed elsewhere herein) and consequent reduction in attenuation remains. For another example, use of flow-through foam configured to block the airflow holes would heighten the acoustic attenuation but at the cost of reduced airflow through the acoustic attenuator, and here again the risk of contaminant/particle entrapment and consequent reduction in attenuation and airflow remains.

Similarly to the arched main body 502, the acoustic damping material 508 (or "acoustic damping sheet") comprises the same or similar airflow holes 521 (or "airflow orifices") through the layer(s) of acoustic damping material 508 (i.e., 508a, 508b) as the airflow holes 501 through the arched main body 502. Note that the illustrated configuration (e.g., shape, size, placement, etc.) of the airflow holes 501 through the arched main body 502 and the airflow holes 521 through the acoustic damping material 508 is an example, and in practice may vary from implementation to implementation based on, for example, the structural configuration of a corresponding chassis (e.g., chassis 300 of FIG. 3) in which the arched component 500, 520 may be installed (including, for example, the positioning of corresponding cooling fans such as fans 304 of FIG. 3, and the positioning of data storage devices such as data storage devices 302 of FIG. 3), the positioning of the plate component 500, 520 within the corresponding chassis, the airflow patterns internal to the chassis, the positioning of airflow holes 401, 421 of plate component 400, and like considerations. However, according to an embodiment, the airflow holes 501 through the arched main body 502 and the airflow holes 521 through the acoustic damping material 508 are positioned in alignment with each other, so that the acoustic damping material 508 does not cover the airflow holes 501 so that airflow holes 501 and 521 collectively provide for the passage of airflow from the fans 304 through the arched component 520 to the storage devices 302, when installed in a chassis such as chassis 300.

Chambered Acoustic Attenuator Assembly

Figure 6:
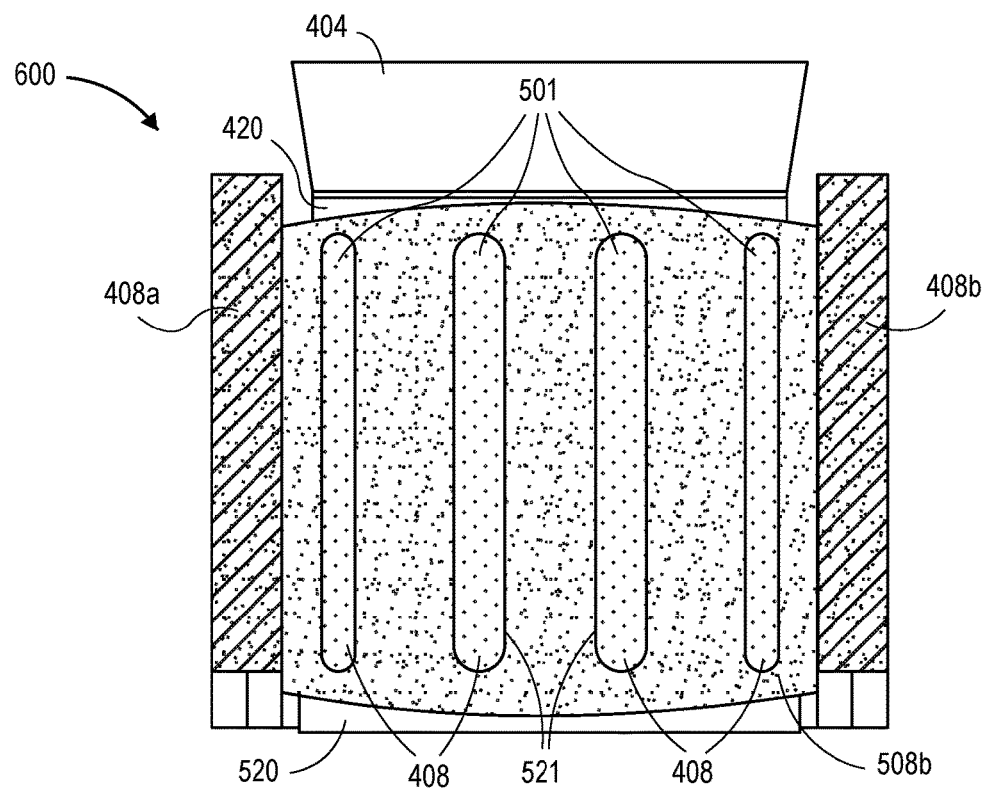
FIG. 6 is a front view illustrating a multibody chambered acoustic attenuator, according to an embodiment.

FIG. 6 is a front view illustrating a multibody chambered acoustic attenuator, according to an embodiment. Acoustic attenuator 600 comprises the plate component 420 (FIG. 4B) coupled with the convex arched component 520 (FIG. 5B), which creates a 3-dimensional chamber having an internal or interior space or volume. According to an embodiment, the ("first") airflow holes 401 constituent to the main body 402 of the plate component 400, 420 and the ("second") airflow holes 501 constituent to the arched main body 502 of the arched component 500, 520 are not aligned in a direction normal to the main body 402 of the plate component 400, 420, as depicted by the visibility of the acoustic damping material 408 of the plate component 420 through the airflow holes 501 of the arched component 520 rather than the visibility of the airflow holes 401 of the plate component 420. Hence, a circuitous (e.g., non-direct, convoluted) airflow path is provided from the cooling fans to the data storage devices, when installed as in FIG. 7. While a certain portion of air passes through openings cut in the foam material, thereby theoretically reducing the maximum available attenuation, the multibody chambered attenuator 600 staggers the air passages to cause the airflow to follow a tortuous path thereby increasing attenuation by reflection of the air pressure waves off of multiple surfaces before reaching the data storage devices. Stated otherwise, with acoustic attenuator 600 there is no direct airflow through the attenuator from the fan to the drives.

Figure 7:
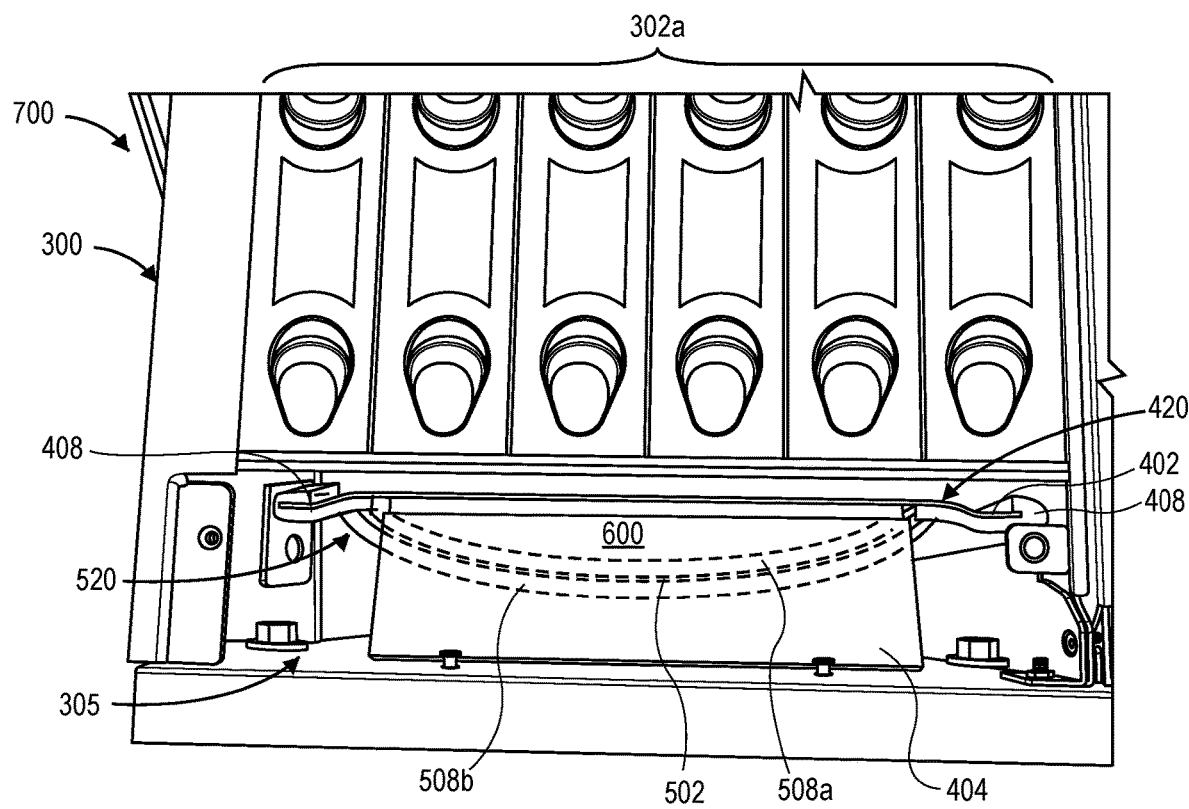
FIG. 7 is a plan view illustrating the multibody chambered acoustic attenuator of FIG. 6 installed in a data storage system chassis, according to an embodiment.

Thus, with (i) the acoustic damping material 408 lining the interior surface (i.e., the surface facing a cooling fan compartment, such as compartment 303 of FIG. 3, when installed as in FIG. 7) of the plate component 420, (ii) the acoustic damping material 508a lining the interior surface (i.e., the surface facing away from the cooling fan compartment, such as compartment 303 of FIG. 3, when installed as in FIG. 7) of the arched component 520, and (iii) the acoustic damping material 508b lining the exterior surface (i.e., the surface facing a cooling fan compartment, such as compartment 303 of FIG. 3, when installed as in FIG. 7) of the arched component 520 (FIG. 6), all air-incidental surfaces are covered, and fan acoustic emissions would have to follow a non-direct convoluted path to reach the drives (e.g., due at least in part to the non-aligned airflow holes 401 of FIGS. 4A, 4B and airflow holes 501 of FIGS. 5A, 5B) and direct acoustic emissions and reflections would then come in contact with the acoustic damping material thereby reducing the acoustic sound pressure. The use of lining three separate surfaces with acoustic damping material increases the attenuation of the fan emitted sound pressure over and above a single layer approach.

Note that the structural configuration of the multibody chambered acoustic attenuator may vary from implementation to implementation. For example, in an alternative embodiment, an offset rectangular component (e.g., a box-like component having a surface surrounded by four sides) may substitute for the convex arched component as long as a chamber having an internal volume in which acoustic waves are reflected is achieved in conjunction with the plate component 420.

FIG. 7 is a plan view illustrating the multibody chambered acoustic attenuator of FIG. 6 installed in a data storage system chassis, according to an embodiment. Installation 700 depicts the acoustic attenuator 600 installed in the air plenum 305 of the data storage system chassis 300, according to an embodiment. Note that the hinged top flap 404 of plate component 400, 420 is shown rotated approximately 90 degrees for installation support purposes, e.g., to help hold the acoustic attenuator 600 in place. Thus, in the illustrated configuration, the acoustic attenuator 600 is positioned between the cooling fan housing compartment 303 (FIG. 3) and the bank of data storage devices 302 (FIG. 3), including the entire first row of data storage devices 302a.

Physical Description of an Illustrative Operating Context

Embodiments may be used in the context of managing structure mode excitation affecting data storage devices, such as hard disk drives (HDDs), within a data storage system. Thus, in accordance with an embodiment, a plan view illustrating an HDD 100 is shown in FIG. 1 to illustrate an exemplary operating context.

Figure 1:
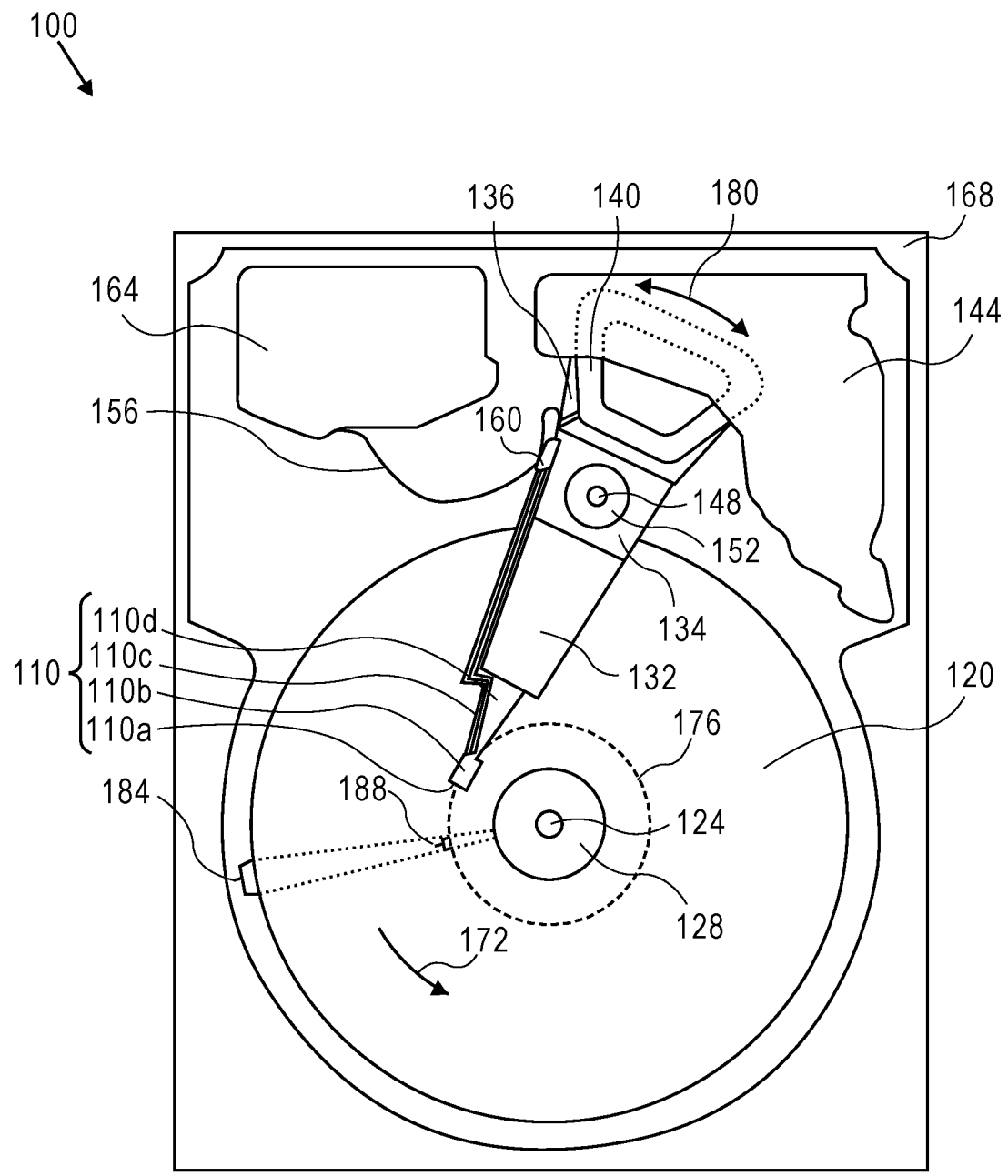
FIG. 1 is a plan view illustrating a hard disk drive (HDD), according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM, and a write signal to and a read signal from the head 110a) are transmitted by a flexible cable assembly (FCA) 156 (or "flex cable"), also at times referred to as a flexible printed circuit (FPC).

Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium or hydrogen for non-limiting examples, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alpha-numeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:
1. A data storage system comprising:
  a system enclosure comprising a chambered attenuator device comprising:
    a plate component comprising a plurality of first airflow holes,
    a complementary arched component comprising a plurality of second airflow holes and coupled with the plate component thereby forming a chamber assembly having an interior space,
    an acoustic damping material coupled to an interior surface of the plate component, and an acoustic damping material coupled to an interior surface and to an exterior surface of the complementary arched component.

2. The data storage system of claim 1, wherein the first airflow holes are constituent to a main body of the plate component, the plate component further comprising:
a hinged top flap; and
a side extension on each side of the main body extending at an angle from the main body.

3. The data storage system of claim 2, wherein the acoustic damping material coupled to the plate component includes acoustic damping material on at least one side extension.

4. The data storage system of claim 2, wherein the side extensions are devoid of the acoustic damping material.

5. The data storage system of claim 2, wherein the top flap is rotated out-of-plane to the main body.

6. The data storage system of claim 1, wherein the acoustic damping material coupled to the plate component does not cover the first airflow holes and the acoustic damping material coupled to the interior and exterior surfaces of the complementary arched component does not cover the second airflow holes.

7. The data storage system of claim 1, wherein:
the first airflow holes are constituent to a main body of the plate component; and
the second airflow holes of the complementary arched component do not align with the first airflow holes of the plate component in a direction normal to the main body of the plate component.

8. The data storage system of claim 1, further comprising:
a plurality of data storage devices;
the system enclosure further comprising:
a system cooling fan housing compartment comprising one or more cooling fans which generate sound pressure in a direction toward the plurality of data storage devices, and
an air plenum positioned between the fan housing compartment and the data storage devices; and
wherein the chambered attenuator device is positioned within the air plenum.

9. The data storage system of claim 1, wherein the complementary arched component has a convex shape relative to the interior space.

10. A chambered acoustic attenuator for suppressing acoustic sound pressure, the acoustic attenuator comprising:
a plate part comprising one or more airflow orifices;
a complementary arched part comprising one or more airflow orifices and coupled with the plate part thereby forming a chamber assembly having an interior space;
an acoustic damping sheet covering an interior surface of the plate part; and
an acoustic damping sheet covering each of an interior surface and an exterior surface of the complementary arched part.

11. The chambered acoustic attenuator of claim 10, wherein each of the acoustic damping sheets has a substantially uniform thickness throughout each respective sheet.

12. The chambered acoustic attenuator of claim 10, wherein the airflow orifices of the plate part are constituent to a main portion of the plate part, the plate part further comprising:
a hinged top portion; and
a side portion on each side of the main portion and extending from the main portion.

13. The chambered acoustic attenuator of claim 12, wherein the acoustic damping sheet coupled to the plate part includes acoustic damping sheet covering and wrapped at least in part around the side portions.

14. The chambered acoustic attenuator of claim 10, wherein:
the airflow orifices of the plate part are constituent to a main portion of the plate part; and
the airflow orifices of the complementary arched part do not align with the airflow orifices of the plate part in a direction perpendicular to the main portion of the plate part.

15. The chambered acoustic attenuator of claim 10, wherein at least one of the acoustic damping sheets comprises a plurality of sheets of damping material, which damps acoustic energy by way of compression, intercoupled with adhesive backing.

16. The chambered acoustic attenuator of claim 10, wherein at least one of the acoustic damping sheets comprises a single sheet of damping material having a substantially uniform thickness.

17. A data storage system comprising:
a plurality of data storage devices;
cooling means for cooling the data storage devices; and
chambered damping means including a plate component comprising a plurality of first airflow holes and a complementary arched component comprising a plurality of second airflow holes and coupled with the plate component to form an interior volume, and positioned between the cooling means and the data storage devices for damping sound pressure from the cooling means toward the data storage devices while simultaneously providing a circuitous airflow path from the cooling means to the data storage devices.

18. The data storage system of claim 1, wherein the acoustic damping material comprises acoustic damping sheets each having a substantially uniform thickness throughout each respective sheet.

19. The data storage system of claim 1, wherein the acoustic damping material comprises acoustic damping sheets at least one of which comprises a plurality of sheets of damping material, which damps acoustic energy by way of compression, intercoupled with adhesive backing.

20. The data storage system of claim 1, wherein the acoustic damping material comprises acoustic damping sheets at least one of which comprises a single sheet of damping material having a substantially uniform thickness.

* * * * *